United States Patent
Brunet et al.

(10) Patent No.: US 8,533,684 B2
(45) Date of Patent: Sep. 10, 2013

(54) SOURCE IDENTIFICATION OF COMPLIANCE ERRORS IN A WEB PAGE WITH CUSTOM WIDGETS

(75) Inventors: Thomas A. Brunet, Round Rock, TX (US); Michael A. Strack, Round Rock, TX (US); Allen K. Wilson, Austin, TX (US); Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 12/916,781

(22) Filed: Nov. 1, 2010

(65) Prior Publication Data

US 2012/0110384 A1 May 3, 2012

(51) Int. Cl.
 *G06F 11/07* (2006.01)
(52) U.S. Cl.
 USPC ............................................. 717/128; 714/37
(58) Field of Classification Search
 USPC ........................................... 714/37; 717/128
 See application file for complete search history.

(56) References Cited

U.S. PATENT DOCUMENTS

| | | | |
|---|---|---|---|
| 6,836,857 B2 * | 12/2004 | Ten-Hove et al. | 714/34 |
| 6,895,551 B1 | 5/2005 | Huang et al. | |
| 8,196,112 B1 * | 6/2012 | Cansizlar | 717/126 |
| 8,224,997 B2 * | 7/2012 | Strack et al. | 709/246 |
| 2004/0148568 A1 | 7/2004 | Springer | |
| 2005/0091647 A1 * | 4/2005 | McCollum et al. | 717/130 |
| 2006/0173892 A1 * | 8/2006 | Beck | 707/102 |
| 2006/0259898 A1 * | 11/2006 | Reinhardt | 717/124 |
| 2008/0091651 A1 * | 4/2008 | O'Farrell et al. | 707/3 |
| 2008/0301502 A1 * | 12/2008 | Harsha et al. | 714/37 |
| 2009/0019310 A1 * | 1/2009 | Nastacio et al. | 714/26 |
| 2009/0113287 A1 * | 4/2009 | Yee | 715/234 |
| 2009/0300709 A1 | 12/2009 | Chen et al. | |
| 2009/0307666 A1 * | 12/2009 | Kilian et al. | 717/125 |
| 2010/0011341 A1 * | 1/2010 | Baierl et al. | 717/110 |

OTHER PUBLICATIONS

"GreaseMonkey", http://www.greasespot.net, printed Oct. 20, 2010, 9 pages.
"Jetpack", https://jetpack.mozillalabs.com, printed Oct. 20, 2010, 2 pages.
Chen, Alex Q. et al., "Exploring Widget Identification Techniques for Web Accessibility", HCW—WIMWAT Technical Report 3, Jul. 2009, 41 pages.
Pilgrim, Mark , "Greasemonkey Scripts", http://commons.oreilly.com/wiki/index.php/Greasemonkey_Hacks/Accessibility, Greasemonkey hacks, Chapter 8 Accessibility, 2005, 35 pages.

* cited by examiner

*Primary Examiner* — Don Wong
*Assistant Examiner* — Theodore Herbert
(74) *Attorney, Agent, or Firm* — Stephen R. Tkacs; Stephen J. Walder, Jr.; Eustus D. Nelson (57) ABSTRACT

A mechanism is provided to automate the mapping so that custom widgets that cause compliance errors in the Web page can be identified automatically. The mechanism dynamically creates and inserts debug directives into the HTML code generated from a custom widget in a Web page so that a compliance error found in the generated code can be traced back to the custom widget that caused the error.

20 Claims, 3 Drawing Sheets

```
<span widgetid="myButton" class=dijit dijitReset dijitLeft dijitInline dijitButton"
dojoattachevent="onclick:_onButtonClick,onmouseenter:_onMouse,onmouseleave:_onMouse,on
mousedown:_onMouse"><span class="dijitReset dijitRight dijitInline"><span class="dijitReset
dijitInline dijitButtonNode"><button style="-moz-user-select: none;" tabindex="0" id="myButton"
aria-labelledby="myButton_label" role="button" class="dijitReset dijitStretch dijitButtonContents"
dojoattachpoint="titleNode,focusNode" type="button" value="" wairole="button"
waistate="labelledby-remove_label"><span class="dijitReset dijitInline"
dojoattachpoint="iconNode"><span class="dijitReset dijitToggleButtonIconChar">   </span></
span></button></span></span>
```

FIG. 6

```
<!--IBM.WSD_start-->    ← 502
<span widgetid="myButton" class=dijit dijitReset dijitLeft dijitInline dijitButton"
dojoattachevent="onclick:_onButtonClick,onmouseenter:_onMouse,onmouseleave:_onMouse,on
mousedown:_onMouse"><span class="dijitReset dijitRight dijitInline"><span class="dijitReset
dijitInline dijitButtonNode"><button style="-moz-user-select: none;" tabindex="0" id="myButton"
aria-labelledby="myButton_label" role="button" class="dijitReset dijitStretch dijitButtonContents"
dojoattachpoint="titleNode,focusNode" type="button" value="" wairole="button"
waistate="labelledby-remove_label"><span class="dijitReset dijitInline"
dojoattachpoint="iconNode"><span class="dijitReset dijitToggleButtonIconChar">   </span></
button></span></span>
<!--IBM.WSD_end: html/body/div[@id='myButton']-->    ← 504
```

FIG. 4

```
<div id="myButton" dojoType="dijit.form.Button"></div>
```

SOURCE IDENTIFICATION OF COMPLIANCE ERRORS IN A WEB PAGE WITH CUSTOM WIDGETS

BACKGROUND

The present application relates generally to an improved data processing apparatus and method and more specifically to mechanisms for identification of compliance errors in a source Web page having custom widgets.

Hypertext markup language (HTML) is the predominant markup language for web pages. One writes a Web page in the form of HTML elements consisting of "tags" surrounded by angle brackets within the Web page content. HTML is the building blocks of all basic websites. Cascading style sheets (CSS) represents a style sheet language used to describe the presentation semantics (the look and feel) of a document written in a markup language. The most common application of CSS is to style web pages written in HTML and extensible hypertext markup language (XHTML). CSS is designed primarily to enable the separation of document content from document presentation, including elements such as the layout, colors, and fonts.

A custom widget is a building block that provides customization or increased functionality of a portion of a Web page. The Web page usually specifies a custom widget using HTML tags with special attributes and CSS markup. After the initial page loading process, the Web browser locates the tags with these attributes and modifies, expands, or replaces the tags as specified in the widget.

SUMMARY

In one illustrative embodiment, a method, in a data processing system, is provided for identifying compliance errors in a page with custom widgets. The method comprises receiving, by the data processing system, original page source for a page to be rendered. Responsive to a page update event resulting from parsing a custom widget in the page, the method comprises inserting, by the data processing system, a debug directive that identifies a path to the custom widget in the original page source. Responsive to a validation tool detecting an error, the method comprises reporting, by the data processing system, the path to the custom widget in the original page source using the debug directive.

In other illustrative embodiments, a computer program product comprising a computer useable or readable medium having a computer readable program is provided. The computer readable program, when executed on a computing device, causes the computing device to perform various operations, and combinations of operations, outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various operations, and combinations of operations, outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for identifying compliance errors in a Web page having custom widgets. After the Web browser initially loads the Web page, the Web browser locates the tags associated with custom widgets and modifies, expands, or replaces the tags as specified in the widgets. In accordance with the illustrative embodiments described below, the Web browser generates a document object model (DOM) for the initial page load. The document object model (DOM) is a cross-platform and language-independent convention for representing and interacting with objects in HTML, XHTML, and extensible markup language (XML) documents. Aspects of the DOM may be addressed and manipulated within the syntax of the programming language in use. A web browser is not obliged to use DOM in order to render an HTML document; however, the DOM is required by JavaScript scripts that wish to inspect or modify a web page dynamically. In other words, the DOM is the way JavaScript sees its containing HTML page and browser state. As the Web browser modifies, expands, or replaces the custom tags to render the web page, the DOM is updated accordingly.

The term "HTML markup" refers to a serialized, data format. HTML markup is processed by the browser. As the browser parses the HTML markup, it creates an internal representation of the page referred to as the document object model (DOM). The browser and tools within the browser can get access to and make changes to nodes, elements, and other data in the DOM via the DOM application program interface (API). Tools can use this mechanism to generate "HTML markup" that can be written to disk, but the DOM itself is not HTML.

Custom widgets make compliance validation of the Web page more difficult. Validation tools are unable to properly validate all custom widgets contained in the initial source of a Web page as they can for Web pages containing only standard HTML markup because Web authors can create an unbounded set of custom widgets that modify the DOM. A more practical way to verify a page that uses custom widgets is to verify the DOM, or the HTML markup of a serialized DOM, of the fully rendered page because the fully rendered Web page does not contain any unprocessed widgets and can be validated by a validation tool that is not specifically designed to handle custom widgets. Widgets can also contain only HTML markup. The difference is whether or not the widget generator code has executed. Validation tools cannot predict how the widget generator code will modify the DOM, but if the modifications have already occurred, no such prediction is necessary.

A consequence of this approach is that the validation tool reports the location (usually xPath) of a compliance error in the DOM of the fully rendered page. To fix a detected error, additional steps are needed to identify the mapping back to the custom widget that generated the DOM elements containing the error. Further, if the custom widgets are generated by a server-side program, an additional mapping may be required from the custom widgets in the browser back to the server with the generating code in order to fix the problem.

Thus, the illustrative embodiments provide a mechanism to automate the mapping so that custom widgets that cause compliance errors in the Web page can be identified automatically. The mechanism dynamically creates and inserts debug directives into the DOM elements generated from a custom widget in a Web page so that a compliance error found in the generated elements can be traced back to the custom widget that caused the error.

Figure 1:
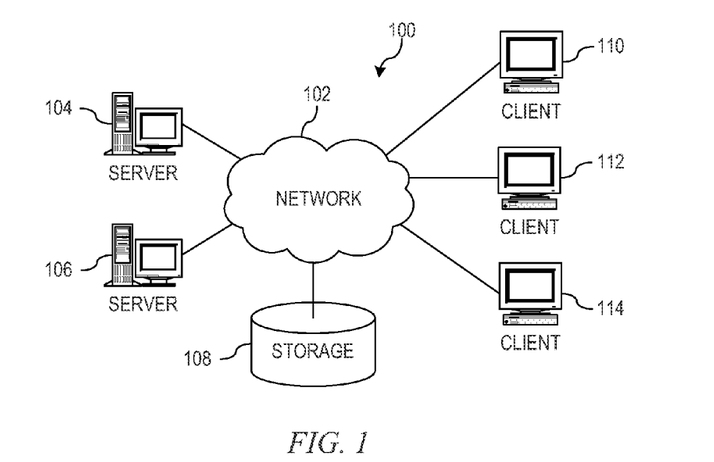
FIG. 1 depicts a pictorial representation of an example distributed data processing system in which aspects of the illustrative embodiments may be implemented.
Figure 2:
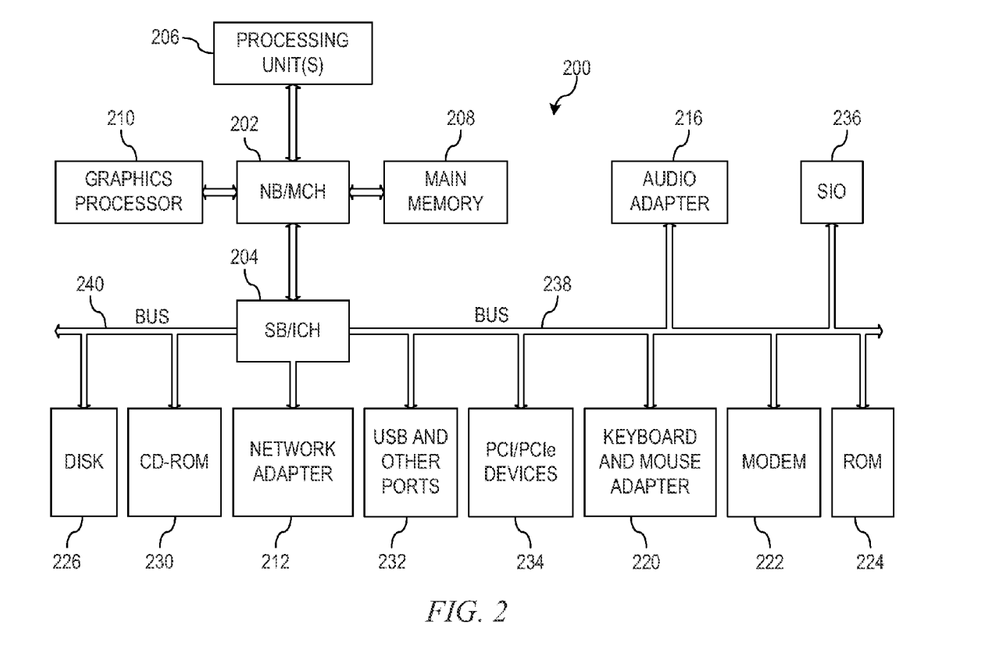
FIG. 2 is a block diagram of an example data processing system in which aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation, this is only an example and is not intended to state or imply any limitation with regard to the features of the present invention. To the contrary, the illustrative embodiments are intended to include distributed data processing environments and embodiments.

With reference now to the figures and in particular with reference to FIGS. 1 and 2, example diagrams of data processing environments are provided in which illustrative embodiments of the present invention may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® 7 (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
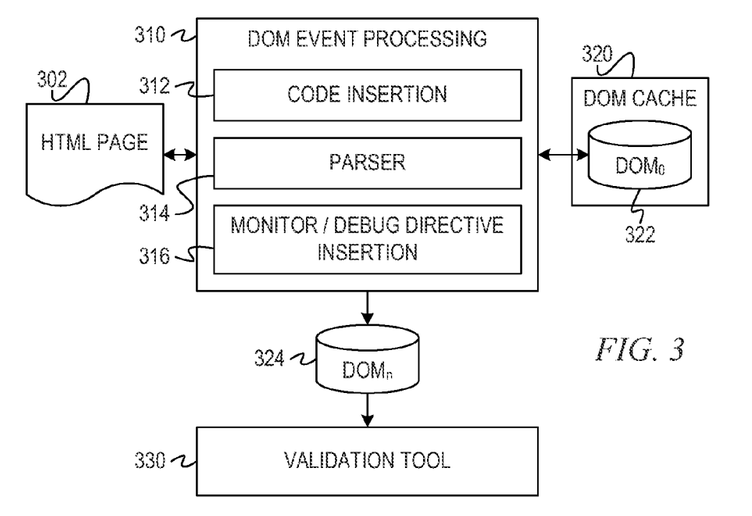
FIG. 3 is a block diagram illustrating a document object model event processing component and validation tool in accordance with an illustrative embodiment.

FIG. 3 is a block diagram illustrating a document object model event processing component and validation tool in accordance with an illustrative embodiment. The document object model (DOM) event processing component 310 and validation tool 330 may exist at a server to validate hypertext markup language (HTML) pages before they are delivered to a Web client. Alternatively, DOM event processing component 310 and validation tool 330 may exist at the client, such as part of a Web browser for performing compliance validation at the time the Web page is rendered in the Web browser. Yet, in another case, DOM event processing component 310 may exist at the client as part of a Web browser, while validation tool 330 may exist at the server for performing compliance validation of the page content received from the Web browser.

DOM event processing component 310 receives a Web page 302, which is a HTML page, to be rendered by a Web browser. DOM event processing component 310 comprises a code insertion component 312, a parser 314, and a monitor/debug directive insertion component 316. Code insertion component 312 dynamically inserts code into HTML page 302 to capture DOM events.

In one example embodiment, code insertion component 312 dynamically inserts JavaScript code into Web page 302 to capture DOM events, including an initial page load event along with subsequent DOM update events. As an example, a Web browser may dynamically insert JavaScript into the page using a JavaScript framework or a browser extension. Alternatively, the page author or server-side code may insert JavaScript into the page. The JavaScript may capture a DOM event by specifying a callback function in the DOM event listeners of a browser. The browser automatically passes the updated nodes to the callback function as a parameter. The following is an example of a callback function in the DOM event listeners: document.addEventListener ("DOMNodeInserted", "callback_function", false).

DOM event processing component 310 intercepts and clones the initial DOM ($DOM_0$ 322) of a page, which is the DOM after the initial page load but before parsing of custom widgets. DOM event processing component 310 stores $DOM_0$ 322 in DOM cache 320.

Parser 314 parses HTML page 302, including custom widgets. Monitor/debug directive insertion component 316 monitors page updates as a result of widget parsing and page rendering to retrieve nodes that are updated during widget parsing. Monitor/debug directive insertion component 316 correlates the updated nodes to a node in the initial DOM ($DOM_0$ 322) based on node ID or coupling of page update events to retrieve the xPath of the node in the initial DOM. XML path language, or xPath, is a query language for selecting nodes from an XML document, such as a DOM. Monitor/debug directive insertion component 316 generates a debug directive for each updated node based on the xPath of the node in $DOM_0$ 322. Monitor/debug directive insertion component 316 inserts the debug directive right before and after each updated node.

In accordance with an example embodiment, debug directive is a program language-specific comment, defined as a pair of start ("IBM.WSD_start") and end ("IBM.WSD_end: <xPath>") clauses. A debug directive indicates that the lines of code bounded by a start clause and an end clause are generated by a custom widget in the original page source identified by the xPath in the end clause. For each updated node, monitor/debug directive insertion component 316 creates a debug directive and then dynamically inserts the debug directive before and after the corresponding node(s) or element(s) that are updated, respectively.

Figure 4:
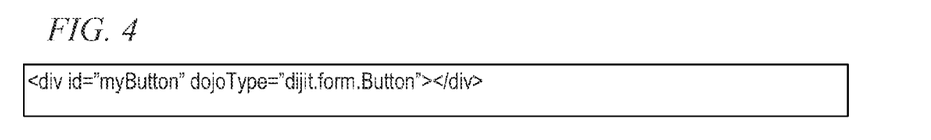
FIG. 4 illustrates a Web page snippet that uses a button widget in accordance with an example embodiment.
Figure 5:
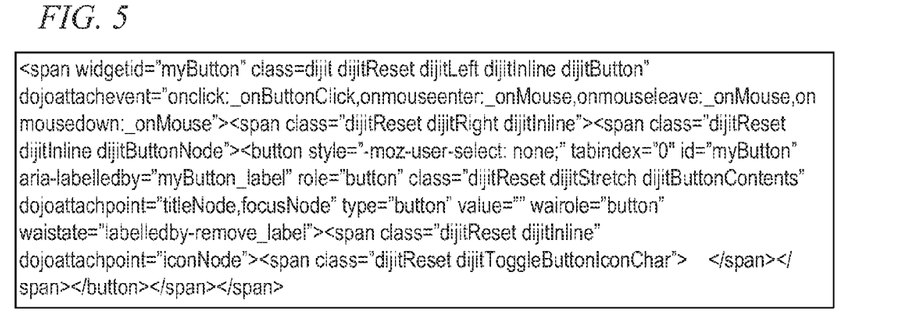
FIG. 5 illustrates code corresponding to a document object model from the custom widget in FIG. 4 after a Web page is fully rendered in accordance with an example embodiment.
Figure 6:
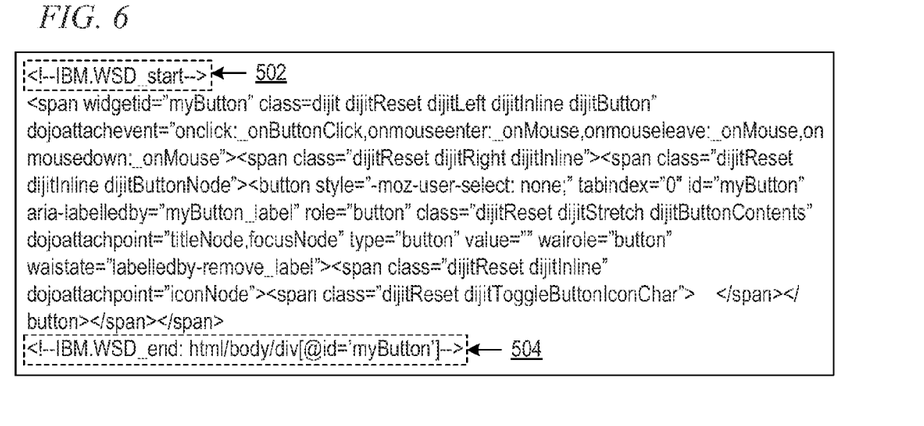
FIG. 6 illustrates code containing a debug directive in accordance with an example embodiment.

FIG. 4 illustrates a Web page snippet that uses a button widget in accordance with an example embodiment. FIG. 5 illustrates code corresponding to a document object model from the button widget in FIG. 4 after a Web page is fully rendered in accordance with an example embodiment. After the Web page containing the custom widget in FIG. 4 is fully rendered by a Web browser, the resultant HTML code corresponding to the DOM from this custom widget is shown in FIG. 5. FIG. 6 illustrates code containing a debug directive corresponding to the code in FIG. 5 in accordance with an example embodiment. The DOM event processing component 310, for example, creates the HTML code in FIG. 6 by adding debug directive 502, 504 to the HTML code in FIG. 5. The debug directive comprises start clause 502 and end clause 504, where the end clause 504 indicates an xPath to the original page source of the widget.

DOM event processing component 310 captures the DOM containing the debug directives after all the custom widgets have been parsed ($DOM_n$ 324) and sends the HTML code corresponding to $DOM_n$ 324 to validation tool 330 for compliance validation. Validation tool 330 may then report the xPath of the node that causes a detected compliance error in the initial $DOM_0$ 322, which is correlated to the original HTML page 302.

As an example, an accessibility validation tool may report an error, "button without an accessible name," with the location "/html/body/span/span/button [@id='myButton']" in the HTML code shown in FIG. 6, for example. The validation tool can then trace this error location back to the location "html/body/div[@id='myButton']" in the original page source in FIG. 4 using the debug directive 502, 504 contained in the HTML code in FIG. 6.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 7:
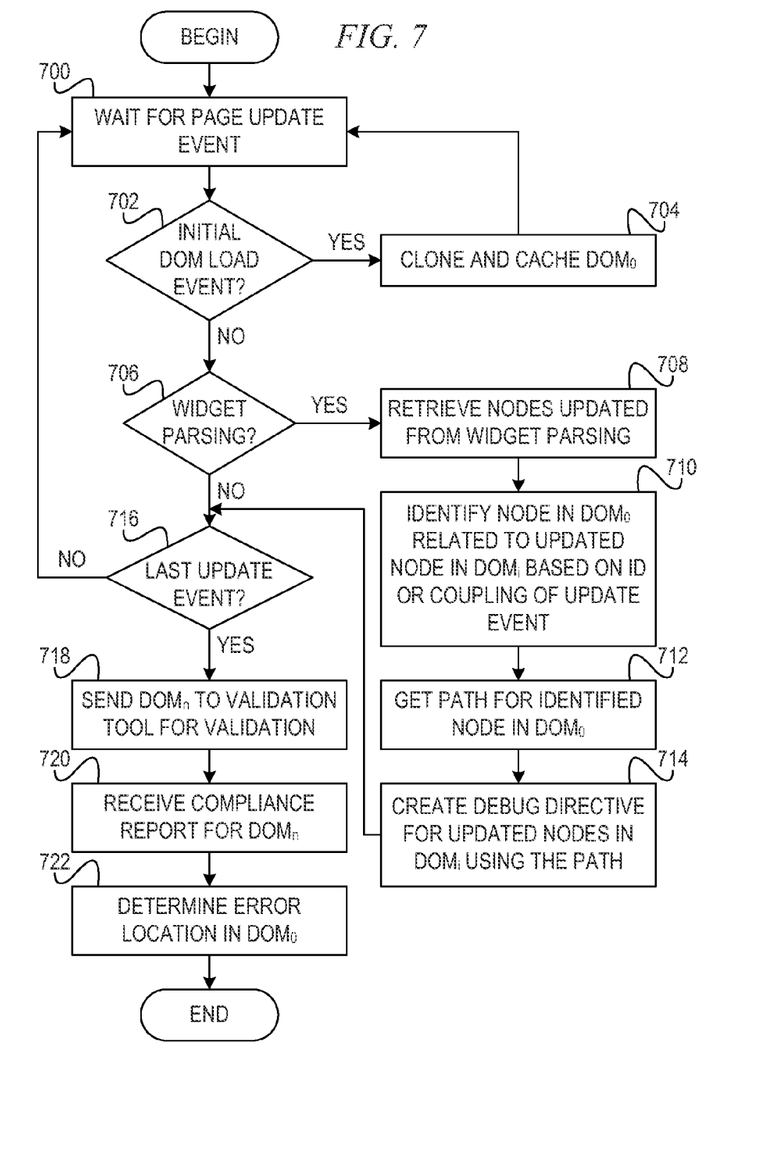
FIG. 7 is a flowchart illustrating operation of a page update event resulting from parsing a custom widget in accordance with an illustrative embodiment.

FIG. 7 is a flowchart illustrating operation of a mechanism for identifying compliance errors in a Web page with custom widgets in accordance with an illustrative embodiment. Operation begins, and the mechanism waits for a page update event (block 700), and the mechanism determines whether the page update event is an initial page load event (block 702). An initial page load event results in generation of an initial document object model ($DOM_0$) corresponding to the original web page. Subsequent page update events result in updates to the $DOM_0$; therefore, parsing of the page results in a series of document object models {$DOM_0$, $DOM_1$, ..., $DOM_n$}, where $DOM_0$ is the DOM resulting from the initial page load and $DOM_n$ is the DOM for the fully rendered page. If the page update event is for the initial DOM load event, the mechanism clones and caches $DOM_0$ (block 704), and operation returns to block 700 to wait for a page update event.

If the page update event is not the initial DOM load event in block 702, then the mechanism determines whether the page update event results from widget parsing (block 706). If the mechanism determines that the page update event results from widget parsing, then the mechanism retrieves nodes updated from widget parsing (block 708), identifies a node in $DOM_0$ related to the updated node in the current DOM, $DOM_i$, based on ID or coupling of the update event (block 710), and gets a path for the identified node in $DOM_0$ (block 712). Then, the mechanism creates a debug directive for updated nodes in $DOM_i$ using the path (block 714).

Thereafter, or if the page update event does not result from widget parsing in block 706, the mechanism determines whether the page update event is the last update event (block 716). The last update event is corresponding to the processing of the last node that contains a custom widget in the $DOM_0$. It can be determined by monitoring the update of the last node, a timeout period during which no update event has happened, other heuristics, or combination of the above that a programmer may determine to use. If the page update event is not the last update event, meaning the page has not been fully rendered, then operation returns to block 700 to wait for a page update event. However; if the page is fully rendered and the page update event is the last page update event in block 716, then the mechanism sends the current DOM, $DOM_n$, to a validation tool for validation (block 718). Then, the mechanism receives a compliance report for $DOM_n$ (block 720) and determines an error location in $DOM_0$ by tracing the error location in $DOM_n$ to $DOM_0$ using the debug directive (block 722). Thereafter, operation ends.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms to automate the mapping so that custom widgets that cause compliance errors in the Web page can be identified automatically. The mechanism dynamically creates and inserts debug directives into the HTML code generated from a custom widget in a Web page so that a compliance error found in the generated code can be traced back to the custom widget that caused the error.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for identifying compliance errors in a page with custom widgets, the method comprising:

receiving, by the data processing system, original page source for a page to be rendered;

responsive to an initial page load event resulting in generation of an initial document object model for the original page source, storing, by the data processing system, the initial document object model;

responsive to a page update event resulting from parsing a custom widget in the page, retrieving an updated node in a current document object model that is updated from parsing the custom widget, identifying a path to a node in the initial document object model related to the updated node in the current document object model, generating a debug directive in association with the updated node in the current document object model, wherein the debug directive indicates the path to the node in the initial document object model related to the updated node in the current document object model, and inserting, by the data processing system, the debug directive into the updated node in the current document object model; and responsive to a validation tool detecting an error, reporting, by the data processing system, the path to the custom widget in the original page source using the debug directive.

2. The method of claim 1, further comprising:

responsive to the initial page load event resulting in generation of the initial document object model for the original page source, cloning, by the data processing system, the initial document object model.

3. The method of claim 1, further comprising:

responsive to the page being fully rendered, providing the current document object model to a validation tool.

4. The method of claim 3, further comprising:
receiving a compliance report from the validation tool, wherein the compliance report identifies a detected compliance error in a given node in the current document object model; and
determining a location in the initial document object model based on a debug directive associated with the given node in the current document object model.

5. The method of claim 1, wherein a Web browser dynamically inserts code to capture page update events into the original page source using a JavaScript framework or a browser extension.

6. The method of claim 1, wherein a page author or server-side code inserts code into the page to capture page update events.

7. A computer program product comprising a computer readable storage medium having a computer readable program stored therein, wherein the computer readable program, when executed on a computing device, causes the computing device to:
receive, by the computing device, original page source for a page to be rendered;
responsive to an initial page load event resulting in generation of an initial document object model for the original page source, store, by the computing device, the initial document object model;
responsive to a page update event resulting from parsing a custom widget in the page, retrieve an updated node in a current document object model that is updated from parsing the custom widget, identify a path to a node in the initial document object model related to the updated node in the current document object model, generate a debug directive in association with the updated node in the current document object model,
wherein the debug directive indicates the path to the node in the initial document object model related to the updated node in the current document object model, and insert, by the computing device, the debug directive into the updated node in the current document object model; and
responsive to a validation tool detecting an error, report, by the computing device, the path to the custom widget in the original page source using the debug directive.

8. The computer program product of claim 7, wherein the computer readable program further causes the computing device to:
responsive to the initial page load event resulting in generation of the initial document object model for the original page source, clone, by the computing device, the initial document object model.

9. The computer program product of claim 7, wherein the computer readable program further causes the computing device to:
responsive to the page being fully rendered, provide the current document object model to a validation tool.

10. The computer program product of claim 9, wherein the computer readable program further causes the computing device to:
receive a compliance report from the validation tool, wherein the compliance report identifies a detected compliance error in a given node in the current document object model; and
determine a location in the initial document object model based on a debug directive associated with the given node in the current document object model.

11. The computer program product of claim 7, wherein a Web browser dynamically inserts code to capture page update events into the original page source using a JavaScript framework or a browser extension.

12. The computer program product of claim 7, wherein a page author or server-side code inserts code into the page to capture page update events.

13. The computer program product of claim 7, wherein the computer readable program is stored in a computer readable storage medium in a data processing system and wherein the computer readable program was downloaded over a network from a remote data processing system.

14. The computer program product of claim 7, wherein the computer readable program is stored in a computer readable storage medium in a server data processing system and wherein the computer readable program is downloaded over a network to a remote data processing system for use in a computer readable storage medium with the remote system.

15. An apparatus, comprising:
a processor; and
a memory coupled to the processor, wherein the memory comprises instructions which, when executed by the processor, cause the processor to:
receive original page source for a page to be rendered;
responsive to an initial page load event resulting in generation of an initial document object model for the original page source, store the initial document object model;
responsive to a page update event resulting from parsing a custom widget in the page, retrieve an updated node in a current document object is updated from parsing the custom widget, identify a path to a node in the initial document object model related to the updated node in the current document object model, generate a debug directive in association with the updated node in the current document object model, wherein the debug directive indicates the path to the node in the initial document object model related to the updated node in the current ent object model, and insert the debug directive into the updated node in the current document object model; and
responsive to a validation tool detecting an error, report the path to the custom widget in the original page source using the debug directive.

16. The apparatus of claim 15, wherein the instructions further cause the processor to:
responsive to the initial page load event resulting in generation of the initial document object model for the original page source, clone the initial document object model.

17. The apparatus of claim 15, wherein a Web browser dynamically inserts code to capture page update events into the original page source using a JavaScript framework or a browser extension.

18. The apparatus of claim 15, wherein a page author or server-side code inserts code into the page to capture page update events.

19. The apparatus of claim 15, wherein the instructions further cause the processor to:
responsive to the page being fully rendered, provide the current document object model to a validation tool.

20. The apparatus of claim 19, wherein the instructions further cause the processor to:
receive a compliance report from the validation tool, wherein the compliance report identifies a detected compliance error in a given node in the current document object model; and determine a location in the initial document object model based on a debug directive associated with the given node in the current document object model.

* * * * *